US 6,714,675 B1

(12) United States Patent
Atkinson

(10) Patent No.: US 6,714,675 B1
(45) Date of Patent: Mar. 30, 2004

(54) AUTOGRID ANALYSIS

(75) Inventor: Matthew Robert Cole Atkinson, Cottage Grove, MN (US)

(73) Assignee: 3m Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/540,472

(22) Filed: Mar. 31, 2000

Related U.S. Application Data

(63) Continuation-in-part of application No. 09/422,535, filed on Oct. 21, 1999, now Pat. No. 6,633,669.

(51) Int. Cl.[7] ................................................ G06K 9/46
(52) U.S. Cl. ........................ 382/174; 382/201; 382/288
(58) Field of Search ............................... 382/289, 288, 382/291, 129, 133, 174, 201

(56) References Cited

U.S. PATENT DOCUMENTS

| | | | | |
|---|---|---|---|---|
| 4,513,438 A | * | 4/1985 | Graham et al. | 382/134 |
| 5,155,706 A | * | 10/1992 | Haley et al. | 367/7 |
| 5,621,811 A | * | 4/1997 | Roder et al. | 382/147 |
| 5,703,959 A | * | 12/1997 | Asano et al. | 382/133 |
| 5,872,870 A | * | 2/1999 | Michael | 382/291 |
| 5,900,949 A | | 5/1999 | Sampas | |
| 5,946,030 A | | 8/1999 | Cooper | |
| 6,100,901 A | * | 8/2000 | Mohda et al. | 345/440 |
| 6,345,115 B1 | * | 2/2002 | Ramm et al. | 382/133 |
| 6,349,144 B1 | * | 2/2002 | Shams | 382/129 |
| 6,477,273 B1 | * | 11/2002 | Cole Atkinson | 382/174 |

FOREIGN PATENT DOCUMENTS

| | | | |
|---|---|---|---|
| GB | 2318637 A | 4/1998 | |
| WO | WO 98/47006 | 10/1998 | |
| WO | WO 99/08233 | 2/1999 | |

OTHER PUBLICATIONS

Jarreau et al. "2–Dimensional Object Recognition for the ISAC System." Proc. IEEE, Southeastcon '92, vol. 1, Apr. 1992, pp. 27–30.*

*The Image Processing Handbook*, second edition by John C. Russ (CRC Press 1995) pp. 394–396, 416–418.

MicroArray Suite, http://www.scanalytics.com/sos/product/bio/bodyMicroArray.html, Mar. 19, 2000.

IPLab MicroArray Suite for Macintosh, http://www.scanalytics.com/sos/product/hts/bodyMicroArray.html, Mar. 19, 2000.

MACROview™, http://www.genefocus.com/specifications_macroview_software.htm, Mar. 19, 2000.

Molecularware, http://www.molecularware.com/Products/ArrayAnalyzer/ArrayAnalyzer.html, Mar. 19, 2000.

COSE XDotsReader Software, (and the following pages), http://www.cose.fr/us_dots.html, Mar. 19, 2000.

* cited by examiner

*Primary Examiner*—Jon Chang
(74) *Attorney, Agent, or Firm*—Charles L. Dennis; Philip Y. Dahl

(57) ABSTRACT

A method and apparatus for identifying the orientation and positions of the elements of a grid in an image. The elements of the grid need not be parallel to the sides of the image, and the image need not contain all of the elements of the grid. The method can be applied to multi-sided grids, whether rectilinear or distorted. The addresses of identified grid elements can be used to control, e.g., analytical procedures directed to individual elements.

42 Claims, 9 Drawing Sheets

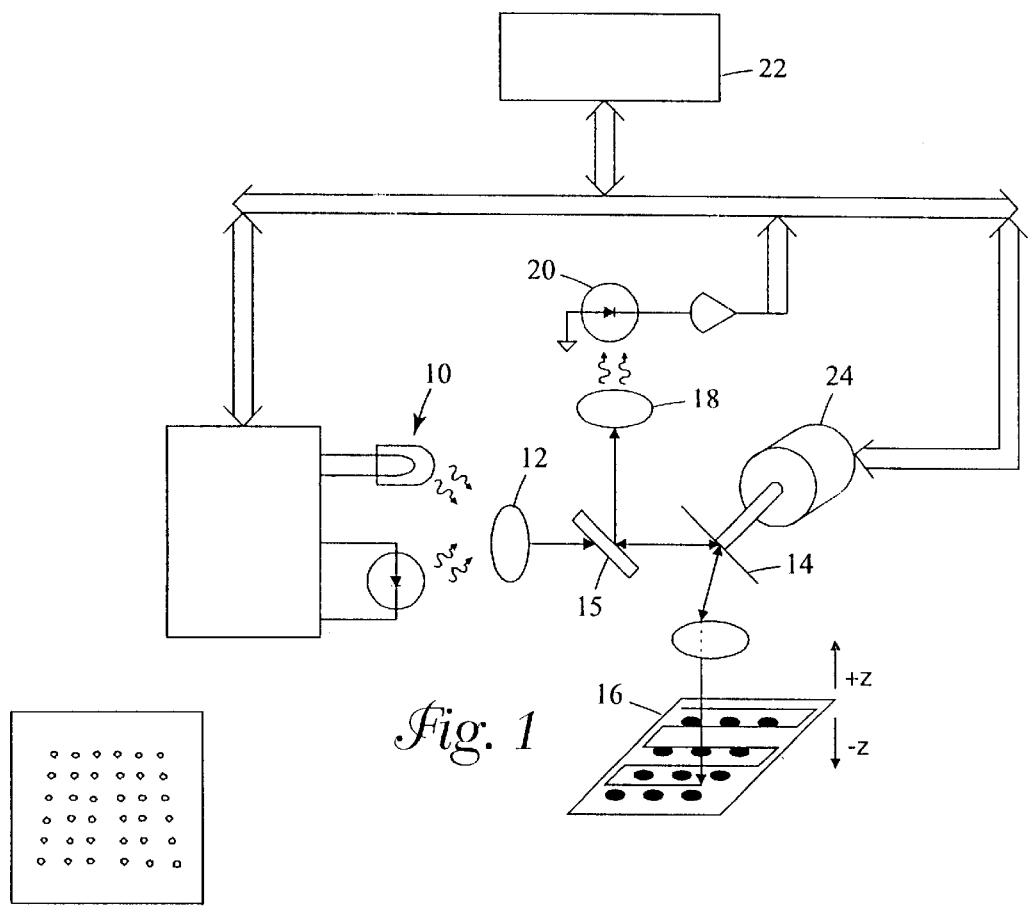
Fig. 1
Fig. 2
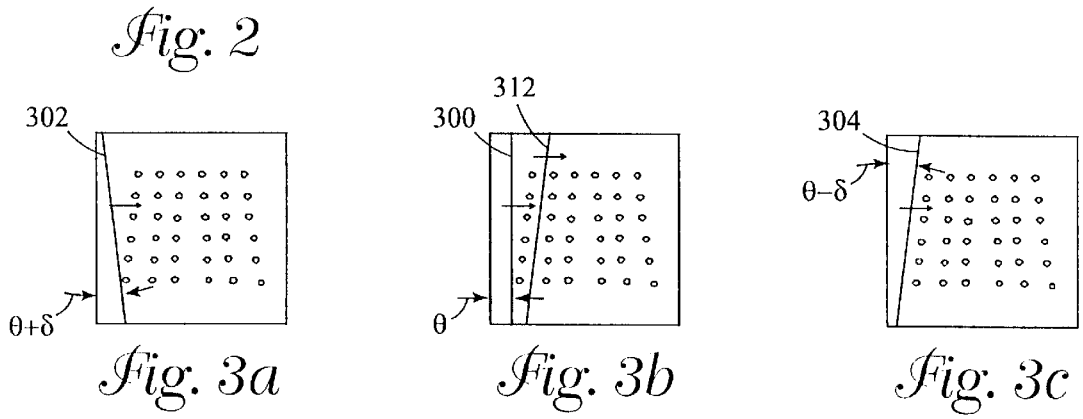
Fig. 3a  Fig. 3b  Fig. 3c
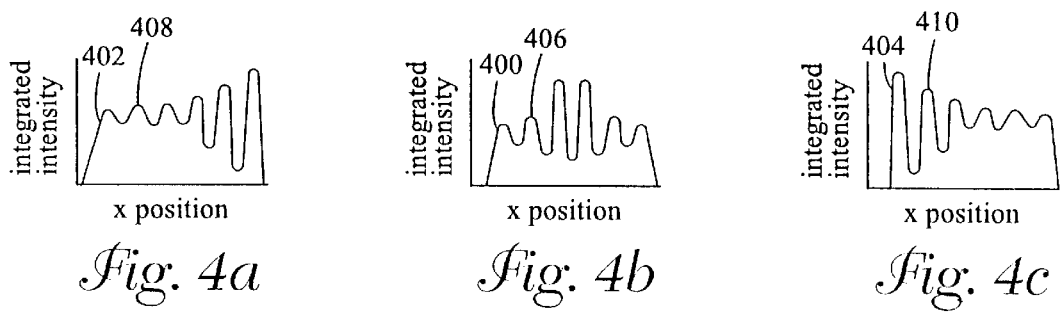
Fig. 4a  Fig. 4b  Fig. 4c distance distance to next feature

AUTOGRID ANALYSIS

CROSS-REFERENCE TO RELATED APPLICATIONS

This is a continuation-in-part of U.S. patent application Ser. No. 09/422,535, filed Oct. 21, 1999 now U.S. Pat. No. 6,633,669.

BACKGROUND OF THE INVENTION

1. Technical Field

The present invention relates to methods of identifying objects in an image, and in particular, to identifying the orientation and position of a grid in an image, and using the resulting grid for measurement.

2. Description of the Related Art

Many applications of machine vision and analysis analyze images which contain information arranged in a grid. For example, WO 99/08233 describes a large number of different types of analyses which can be conducted on assay well plates, gels and blots used in chemical, biochemical and physiological analyses. In that use, the positions of elements on a grid are identified and the elements are probed using a wide variety of assays.

WO 98/47006 takes this a step further, by using the image to identify locations of points on a grid, and injecting reagents onto the grid, e.g., with an ink jet sprayer.

In both cases, however, the position and orientation of the grid are generally known. WO 99/08233 suggests allowing for some slight variation in the grid through the use of fuzzy logic, but the nature of the fuzzy logic to be applied is not described in the application. WO 98/47006 simply assumes one knows the orientation and size of the grid.

Moreover, WO 99/53319 has recently suggested using shrinkable plastic. In this structure, the initial components of the grid are applied to plastic when it is large and the grid elements can be applied easily. The plastic then is shrunk, to reduce the size of the grid elements and resultant density of the elements being tested. This potentially makes manufacturing simpler and less expensive. However, such plastics may not shrink uniformly, so that the grids may be significantly distorted after shrinkage compared to grids on conventional glass or nylon substrates. Current image analysis systems are incapable of automatically identifying the positions of elements in such distorted arrays.

In addition to these chemical applications, there are many manufactured products which include grid-like arrays or cross hatching, such as printed or micro-replicated materials, and chip sockets. Machine vision is a useful way of inspecting such products, but, again, there must be some ability to determine the orientation and position of each element in the grid for this to be useful.

In addition, most electronic analytical systems conduct measurements for every pixel in the field of view. In non-electronic viewing systems, there has been some suggestion to study only interesting features, e.g., to save the time for cytologists, GB 2,318,367 suggests having a system automatically identify interesting features and move a slide under a microscope to jump from one interesting feature to the next, so that the cytologist need only look at the interesting features. However, past conventional electronic scanning systems generally have scanned and analyzed every pixel in the field of view. Particularly if several measurements are being made, e.g., at different frequencies or under different excitation conditions, this collection of data from every pixel can be quite time consuming, since, for example, even a typical 512×512 pixel image has 262,144 pixels, and the scanning system must be physically re-adjusted on each pixel in turn.

SUMMARY OF THE INVENTION

The present invention identifies the orientation and position in a field of view of the elements or features of a grid. The grid may have a considerable degree of variance from a purely rectilinear grid.

To achieve this according to the present invention, an image of a field of view containing a grid is first obtained and digitized into pixels. Using any suitable algorithm, individual features in the image are identified. The centroid position of each feature, the feature area in pixels and the integrated intensity of the feature all are determined. These are used to produce a "collapsed image," where each feature is represented by a point object at the centroid location, with the point object having two associated values (area and integrated intensity).

According to a first embodiment of the invention, a search line is created at one side of the image at a base angle $\theta$ to the side of the image, and swept across the image in steps. At each step, the integrated intensity of each centroid within a predetermined region on either side of the line is determined and recorded. The result is a two dimensional plot with a series of peaks, each peak corresponding to a column of the grid.

Note that this process is different from simply integrating the image intensity along the search line. Due to the use of collapsed images, each feature effectively has its image intensity and area concentrated at its centroid. This will be referred to herein as "centroid integration", and is discussed in more detail in a co-assigned U.S. patent application Ser. No. 09/422,584, filed on Oct. 21, 1999, entitled "Centroid Integration", which is incorporated herein by reference.

Centroid integration results in a set of very well defined peaks in the resulting line profile. Regular integration would result in a set of smeared out peaks and, in the case of a grid with some variation in the positions of the individual features, the result would often be unusable. As a result, centroid integration is much more tolerant of local variation in feature positions than conventional integration.

Centroid integration is repeated with two additional search lines starting at a slight variance angle ($+\delta$ and $-\delta$) to the original search line and swept across the image.

The slope of the first peak on each of the three search lines is determined. The first peak represents the first column, and the steeper the slope on that peak, the closer that search line was to being parallel to the column of the grid. If the difference between the slopes of the three lines is above a predetermined threshold (i.e., outside a tolerance limit), the line with the steepest first peak slope is identified. If it is the middle line, the process is iterated using a smaller variance angle $\pm\delta$. If it is not the middle line, the base angle $\theta$ is reset to match the angle of line with the steepest slope, and the process is iterated using the same variance angle $\pm\delta$ around the new base angle $\theta$. The entire process is iterated until the difference is within the tolerance limit. The angle of the resulting line with the steepest first peak slope will match the angle of the first column of the grid (within the predetermined tolerance limit).

This process is repeated for each peak. For example, the second peak will correspond to the second column, so the search line with the steepest slope on the second peak is the closest to the angle of the second line of the grid. Repeating centroid integration using sweep lines at a base angle $\theta$ and variance angles (±δ) to find the slope of the second peak can define the angle of the second column. The process is repeated for each peak.

After the first peak, it is not necessary to start the sweep lines at the side of the image—each sweep line can be started from position of the prior column. In addition, the angle of each column will probably be reasonably close to the angle of the prior column, so the number of sweeps usually can be minimized by starting with a base angle θ matching the angle of the prior column.

Once the position and orientation of each of the columns is identified, the next step is identifying the rows generally orthogonal to the columns just identified. The rows can be identified using substantially the same process as used to identify the columns, but starting from a side of the image adjacent to the side used to find the columns. The intersections of the best fit columns and the best fit rows are determined, and used to define the nominal points in the grid.

The grid of nominal points preferably is "flexed" to define a final grid. To do this, a local search is performed at each nominal grid point for the local centroid, that is, the centroid nearest in position to the nominal grid point. The position of the local centroid is defined as the final grid point.

In some situations, only portions of a single object on a sample will appear in an image, with the results that multiple features are identified instead of a single feature. This might happen, for example, due to the characteristics of the object on the sample, or due to the image capture technique. An alternate aspect of the invention therefore is to find a centroid of the centroids within a predetermined distance of the nominal grid point, and to define this centroid of centroids as the final grid point. As will be apparent, if a single object is represented by multiple features, this will resolve the multiple features into an effective single feature, while if a single object is represented by a single feature, the centroid of centroids will be in the same position as the centroid of the single feature, so this will have no significant effect.

If no centroid or centroid of centroids is found within some predetermined maximum distance of a nominal grid point, it normally will be assumed that the feature (and centroid) expected at that point is missing, and the nominal grid point is retained as the final grid point.

The locations of all of the final grid points in the flexed grid provide an addressable array of points for the elements in the grid.

According to a second embodiment of the invention, the corners of a grid array are identified first. To do this, a search line is started at a corner of the image, oriented with its normal bisector pointing towards the center of the image. The search line is moved towards the center of the image. The first centroid having an area and/or integrated intensity above a certain threshold limit which is encountered by the line is identified as the corner of the grid for that line. The remaining corners of the grid are identified in similar fashion with lines starting at the other corners of the image. The nominal outline of the grid array is defined by fitting a line between the four identified corners.

Next, a search is conducted along each of the lines in the nominal outline to identify additional centroids forming the outline. Preferably, this identification includes centroids within a predetermined distance of the nominal outline, to allow for a small amount of variability in the grid vertex positions.

If there are no features outside the nominal box plus a margin, then the grid is assumed to be (a) generally rectilinear. A search line is set up parallel to one of the lines forming the nominal outline of the grid. This search line is moved across the image in a series of steps to perform centroid integration, and identify the columns in the grid. A similar search line is set up parallel to an adjacent side of the nominal outline of the grid, and moved across the image to identify the rows in the grid.

If there are features outside one side of the nominal outline of the array, then the grid is assumed to be (b) curved toward that side. In the case of a grid which is distorted by curvature along one axis, a procedure similar to that for a rectilinear grid can be used to identify the grid points, but the procedure must take the curve into account. This is done by using a curved search line which matches the curvature of the grid. Any suitable method of identifying the curve can be used, and, once the curve is identified, the lines are moved in essentially the same fashion as with the rectilinear case (a) above.

In either the rectilinear or curved case, the intersections of the resulting best fit column and rows are used to define the nominal grid points. The grid is flexed to identify the local centroids and final grid positions.

The second embodiment generally requires the entire grid to be in the image, since it starts by finding the corners of the grid. In many situations, e.g., quality control of a large, moving web in production, the grid is not entirely within the image, but the orientation of the grid in the image is known, e.g., because the placement of the field of view relative to the web is known. If so, the grid spacing and position can be identified by using a variation of the second embodiment. In this variation, no attempt is made to identify the corners of the grid, since that is not possible. Instead of using search lines oriented parallel to the sides of the nominal outline defined by the corners of the grid, the same process as in the second embodiment is undertaken using search lines oriented roughly parallel to the expected columns and rows.

The third embodiment of the present invention can handle the most difficult situations, where the grid may be distorted in multiple directions. In this embodiment, the corners of the grid are found and a nominal outline for the grid first defined as in the second embodiment. The second embodiment assumes that the sides are generally a straight line, or at most curved in a single direction, but the third embodiment makes no such assumptions.

According to the third embodiment, after establishing the nominal outline, a search is conducted within a window on either side of one of the sides of the outline to find the centroids near that line. The distances between consecutive centroids along the line are calculated, and the histogram of distances is determined. The first large peak in the histogram corresponds to the nominal spacing along that edge.

The centroids making up the side (the first row or column) then are determined by an iterative process. Starting at one corner along the side, a search is made generally in the direction of the nominal side and a distance corresponding to the nominal spacing along that side. The closest centroid is found and identified as the next edge centroid. A new search then is made starting from the just-located centroid, generally in the direction of the line between the prior centroid and the just-located centroid and out a distance corresponding to the distance between the prior centroid point and the just-located centroid. This process iterates until the centroid at the other end of the side is reached.

Having found the centroids forming the side, a best fit curve then is determined for those centroids. This curve is moved across the image to conduct centroid integration, and locate the centroids corresponding to the next row or column in the grid. If necessary, the centroids in this next row or column may be determined using the same process as described for the first row or column. However, it may be sufficient to simply generate a best fit curve of the centroids forming the centroid integration peak for the row or column. In either case, the new curve is used to find the next row or column.

The process is repeated in the other direction, to find the columns or rows, and the grid is flexed, to find the actual grid centroids.

A fourth embodiment of the invention is useful for grids with other than four sides. In this embodiment, a first search line is moved in from the periphery of the image until it intersects a centroid. This centroid is initially assumed to be a corner of the grid. The search line then is pivoted around this corner centroid to perform centroid integration. The first peak found in the centroid integration defines the side ending at that corner. A search along that side identifies the centroid at the next corner. A new search line then is pivoted about the next corner to find the third corner. The process is repeated at each subsequent corner to find each side and corner until the original centroid is reached again.

Note that very little initial information is required about the number or spacing of the rows and color in the grid, or about their orientation or position within the field of view. In the case of the first embodiment, all that is needed is to know that the grid is generally rectilinear. In the case of the second embodiment, all that is needed is to know that the grid is significantly curved in at most one direction and either that the entire grid is in the image, or that the orientation of the grid relative to the image is known. In the case of the third embodiment, all that is needed is to know that the image contains something that approximates a grid, even if heavily distorted. The fourth embodiment does not even The process is repeated in the other direction, to find the columns or rows, and the grid is flexed, to find the actual grid centroids.

A fourth embodiment of the invention is useful for grids with other than four sides. In this embodiment, a first search line is moved in from the periphery of the image until it intersects a centroid. This centroid is initially assumed to be a corner of the grid. The search line then is pivoted around this corner centroid to perform centroid integration. The first peak found in the centroid integration defines the side ending at that corner. A search along that side identifies the centroid at the next corner. A new search line then is pivoted about the next corner to find the third corner. The process is repeated at each subsequent corner to find each side and corner until the original centroid is reached again.

It may be that a centroid identified by this technique is not actually a corner of the grid, but merely a centroid in a side significantly bowed outwards. One remedy to this situation is to assume that any corner for which the angle between the adjacent sides is greater than some pre-determined number, e.g., 65° for a hexagon which should have a nominal 60° corner angle, is not correctly identified as a corner. This remedy is useful if one knows the nominal shape of the grid. Another remedy requiring less prior information is to determine the angles formed at each corner, and graph them on a histogram. The peak in the histogram representing the smallest angle then is assumed to be the actual angle of the sides of the grid, and angles at least some amount (e.g., a few degrees or two standard deviations of the angles making up the largest angle peak) different than that are assumed to result from centroids which were initially, but erroneously, identified as corners. In either case, a nominal outline then is defined using only the correctly identified corners, and the grid points found through centroid integration as with any of the prior embodiments.

Note that very little initial information is required about the number or spacing of the rows and columns in the grid, or about their orientation or position within the field of view. In the case of the first embodiment, all that is needed is to know that the grid is generally rectilinear. In the case of the second embodiment, all that is needed is to know that the grid is significantly curved in at most one direction and either that the entire grid is in the image, or that the orientation of the grid relative to the image is known. In the case of the third embodiment, all that is needed is to know that the image contains something that approximates a grid, even if heavily distorted. The fourth embodiment does not even require knowing how many sides the grid has. The method of the invention will identify all other information directly.

This low need for initial information has the distinct advantage of minimizing the care that need be taken in placing a grid in the field of view prior to imaging. For example, in the case of a grid used for combinatorial chemistry assays, the grid can simply be placed in the field of view for imaging, with no particular orientation or placement within the field required. Since accurate placement and orientation is time consuming, this can significantly accelerate review of large numbers of samples.

The ability to handle even highly distorted grids allows for processing of materials with highly variable shapes, e.g., because the substrate they are made on is distorted during manufacture or use.

The foregoing analysis can be made from a single image of the field of view, without having to re-focus the system on each pixel. Further reductions in processing time can be achieved by using the information about the grid positions thus obtained to analyze just the significant locations in the field of view, not every pixel in the image. This can be done by re-adjusting the system to study just the pixels surrounding each centroid. Alternatively, the system can be re-adjusted so that the field of view substantially matches the feature around each centroid, and each feature can be analyzed in a single step. The system is re-adjusted from one feature to the next to analyze all of the features.

Typically, the number of features in a grid (e.g., 96 in a DNA grid array) is significantly lower than the total number of pixels in the image (e.g., 262,144 in a 512×512 pixel image). Even if a moderate number of pixels (say 30–50) around each centroid must be analyzed, this dramatically reduces the total number of measurements (262,144 down to 2880–4800) which must be made and analyzed. If system is re-adjusted to match each feature, the total number of measurements needed is even lower, matching the number of features at 96. In either case, total processing time can be reduced markedly from the time required to measure every pixel in the image.

BRIEF DESCRIPTION OF THE DRAWINGS

FIG. 1 is a schematic illustration of a prototypical scanning system with which the present invention might be used.

FIG. 2 is an illustration of an image which might be captured by the scanning system of FIG. 1.

FIGS. 3a, 3b, 3c are illustrations of a scanning process applied to the image of FIG. 2 according to the present invention.

FIGS. 4a, 4b, 4c are graphs illustrating the initial results of the centroid process illustrated in FIGS. 3a, 3b, 3c, respectively.

DETAILED DESCRIPTION OF THE PREFERRED EMBODIMENTS

Figure 5:
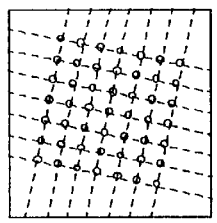
FIG. 5 illustrates a method according to the present invention of defining a set of nominal points on the grid in the image of FIG. 2.

FIG. 1 illustrates a scanning system with which the present invention might be used. In the system of FIG. 1, a focused beam of light moves across an object and the system detects the resultant reflected or fluorescent light. To do this, light from a light source 10 is focused through source optics 12 and deflected by mirror 14 onto the object, shown here as a sample 3×4 DNA array plate 16. The light from the light source 10 can be directed to different locations on the sample by changing the position of the mirror 14 using motor 24. Light that fluoresces or is reflected from sample 16 returns to detection optics 18 via mirror 15, which typically is a half silvered mirror. Alternatively, the light source can be applied centrally, and the emitted or fluoresced light can be detected from the side of the system, as shown in U.S. Pat. No. 5,900,949, or the light source can be applied from the side of the system and the emitted or fluoresced light can be detected centrally, or any other similar variation. Light passing through detection optics 18 is detected using any suitable image capture system 20, such as a television camera, CCD, laser reflective system, photomultiplier tube, avalanche photodiode, photodiodes or single photon counting modules, the output from which is provided to a computer 22 programmed for analysis and to control the overall system. Computer 22 typically will include a central processing unit for executing programs and systems such as RAM, hard drives or the like for data storage. It will be understood that this description is for exemplary purposes only; the present invention can be used equally well with "simulated" images generated from magnetic or tactile sensors, not just with light-based images, and with any object to be examined, not just sample 16.

FIG. 2 illustrates an image of the field of view captured by any suitable system, such as that show in FIG. 1. If not initially created in digital form by the detecting equipment, the image is digitized into pixels. Features of interest in the image are identified by any suitable means. For example, features that are brighter or darker than a certain threshold intensity or features that are between two limiting threshold intensities might be identified as features of interest. Individual features are composed of touching pixels that satisfy the image intensity threshold requirements. This feature detection ability is available in most commercial image capture software packages. A detailed description of one method for achieving this can be found at *The Image Processing Handbook*, second edition by John C. Russ (CRC Press 1995) pages 394–96, 416–18.

Once the features are identified, a "collapsed image" is created. To do this, the centroid of each feature is determined, that is, the point that represents the center of the object based on a weighting scheme. A given feature may or may not be circular, so any suitable algorithm for identifying the centroid may be used, such as integrating intensity or position. The position of the centroid may be recorded in any suitable coordinate system, but typically will be in an X-Y coordinate system. In addition to the centroid, the feature area in pixels, and the integrated intensity of the feature all are determined, and stored in the memory of computer 22. The resulting collapsed image condenses the enormous amount of data in the complete image, e.g., 512×512 pixels of information, to a much smaller array, e.g., 3×4×4 for sample 16, which nevertheless still contains the information needed for present purposes, resulting in dramatically improved processing times.

Note that while the invention is described herein in terms of lines and curves moving across an image, with centroids being within predetermined distances of lines or points, and of graphical analysis of the results of such actions, this is for ease of description. It will be understood by one of skill in the art that it is not necessary to actually make such steps visible on a screen or other display device. Computer 22 can make the relevant calculations, or any mathematically equivalent calculations, without providing a display in the process. For example, computer 22 can process the data most expeditiously by comparing the locations and values in the condensed image array to the calculated locations of the relevant lines and points to which the centroids are being compared.

Also, as used herein, "column" will be used to indicate general alignment of the centroids of a grid in one direction, and "row" to indicate general alignment of the centroids in a direction generally orthogonal to the columns. It will be understood that which direction is the column and which the row is entirely arbitrary, so no significance should be attached to the use of one term over the other, and that the rows and columns may not be entirely straight.

Referring to FIG. 3b, in a first embodiment according to the invention, search line 300 is created at one side of the image at a base angle θ to the side of the image (θ can be 0, as shown in the drawing), and swept across the image in steps. At each step, the integrated intensity of each centroid within a predetermined region (the "smoothing window") on either side of the line is determined and recorded. The result is a two dimensional plot with a series of peaks, each peak corresponding to a column of the grid, as shown in FIG. 4b.

This process is different from simply integrating the image intensity along the search line. Due to the use of collapsed images, each feature effectively has its image intensity and area concentrated at its centroid. This will be referred to herein as "centroid integration".

With proper selection of the size of the smoothing window, centroid integration results in a set of very well defined peaks in the resulting line profile. Regular integration would result in a set of smeared out peaks and, in the case of a grid with some variation in the positions of the individual features, the result would often be unusable. As a result, centroid integration is much more tolerant of local variation in feature positions than conventional integration.

A smoothing window W is used to take into account the local variability of the centroids from their nominal positions. The window size should be based on the pitch of the rows and columns being analyzed. The desired size of smoothing window W is that size which will most clearly generate distinct peaks in the integrated intensity during centroid integration. The smoothing window can be adjusted manually or by any technique which can establish distinct peaks. The minimum value for W in pixels is 1. If the pitch spacing P in pixels is known and is greater than 4, the optimum smoothing window W in pixels will be about:

$$W=0.35*P-1.53$$

This equation has been determined empirically by evaluating a wide range of samples with local feature variations ranging from 0 (no deviation from a regular grid) to 50% (the variation in feature position is so large that the rows or columns overlap).

If the pitch spacing P is not known, one technique for automating the initial selection is to assume that the number of features in each row and column is the square root of the number of features identified in creating the collapsed image, then to approximate the pitch P of the rows and columns by dividing the size of the image by the square root of the number of features. Alternatively, if the nominal dimensions of the grid can be determined (see the second embodiment below), the pitch P can be approximated by dividing the nominal grid dimensions by the square root of the number of features. In either case, the initial smoothing window W can be determined using the equation above. If needed, this initial smoothing window W can be optimized by re-evaluating data to the data using a smoothing window W' varying around this smoothing window W, and selecting the smoothing window W' that provides the clearest peaks.

Turning to FIG. 3a, centroid integration is repeated with a second search line 302 at a slight variance angle (±δ) to the original search angle θ, and in FIG. 3c, with a third search line 304 at a slight variance angle (−δ) to the original search angle θ.

The slope of the first peak 400, 402, 404 (FIGS. 4b, 4a, 4c, respectively) in the resulting centroid integration for the three search lines 300, 302, 304 is determined. The first peak in each graph represents the first column in the grid, and the steeper the slope of the first peak, the closer that corresponding search line was to being parallel to the column of the grid.

If the difference between the slopes of the three peaks 400, 402, 404 is above a predetermined threshold (i.e., outside a tolerance limit), the line 300, 302, 304 with the steepest corresponding first peak slope is identified (line 304 in the example shown in the drawings), and the process is iterated using varying values of θ and δ, until the differences are within the tolerance limit. To this, if the peak 400 has the steepest slope, the next iteration preferably uses the same value for θ as the prior iteration, but a smaller value for δ, while if the peak 400 does not have the steepest slope, the next iteration preferably uses the same value for δ as the prior iteration, but resets θ to match the angle of whichever of lines 302, 304 corresponds to the peak 402, 404 with the steepest slope. The entire process is iterated until the difference between the three slopes is within the tolerance limit. The angle of the final line with the steepest first peak slope will match the angle of the first column of the grid (within the predetermined tolerance limit).

A best fit match at that angle is made of centroids within a predetermined distance (which may or may not be same as the smoothing window W) of the final line to define the nominal position of the first column.

While the best fit for the columns can be identified by finding the crest of the peaks in the centroid integration, columns alternatively may be identified by using the blank regions between peaks in the centroid integration plot to determine the limits on each column, particularly if the blank regions are easier to identify in a particular situation. The centroids within each defined column are used to define a best fit line for the column, with each centroid being weighed by a combination of its area and/or its integrated intensity.

This process is repeated for each peak. For example, the second peaks 406, 408, 410, correspond to the second column, so the search line with the steepest slope on the second peak is the closest to the angle of the second line of the grid. Repeating centroid integration using sweep lines at a base angle θ and variance angles (±δ) to find the slope of the second peak can define the angle of the best fit line for the second column. The process is repeated for each peak.

After the first peak, it is not necessary to start the sweep lines at the side of the image. Each sweep line can be started from the position of the prior column, as shown by line 312 in FIG. 3b. In addition, the angle of each column will probably be reasonably close to the angle of the prior column, so the number of sweeps usually can be minimized by starting with a base angle θ matching the angle of the prior column.

Once the position and orientation of each of the columns is identified, the next step is identifying the rows generally orthogonal to the columns just identified. The rows can be found using substantially the same process just used to identify the columns, but starting from a side of the image adjacent to the side used to find the columns.

The intersections of the best fit columns and the best fit rows are determined, and used to define the nominal points in the grid, as shown in FIG. 5. Preferably, to avoid singularities in the fitting, the equations describing the columns are of the form x=my+b (as opposed to the conventional y=mx+b used for the rows).

Figure 6:
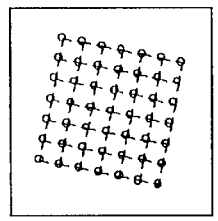
FIG. 6 illustrates a method according to the present invention of defining a set of final points on the grid in the image of FIG. 2.

The nominal grid of FIG. 5 is "flexed" to match the actual centroid locations to the nominal locations to generate a final grid, as shown in FIG. 6. This is done by performing a search for a local centroid within a predefined distance from each nominal grid point. If a local centroid is found, then the position of the local centroid is designated as the final grid point.

Figure 22:
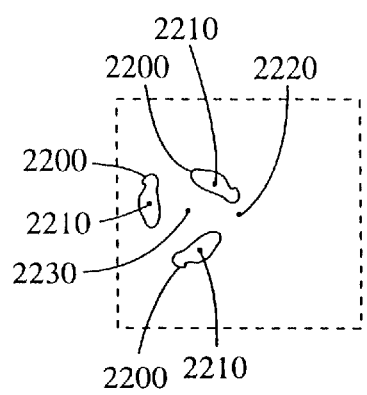
FIG. 22 is a detailed illustration of features representing a particular object in the image of FIG. 2.

In some situations, only portions of a single object on a sample will appear in an image, as shown in FIG. 22, which is a close-up view of the image of FIG. 2 around a single nominal grid point 2220. This results in multiple features 2200 being identified instead of a single feature. This might happen, for example, due to the characteristics of the object on the sample, or due to the image capture technique. To overcome this possibility, preferably the centroids 2210 of the features 2200 which are within the predefined distance of the nominal grid point 2220 are identified. A centroid 2230 of these centroids 2210 determined, and the position of this centroid 2230 of centroids 2210 then is defined as the final grid point.

If no local centroid or centroid of centroids is found, then the location of the nominal grid point is used as the position of the final grid point, on the assumption that a feature in the grid is missing.

After flexing, the result is an array of addresses representing the positions of the actual or expected elements of the grid, which can be used for further analysis, as described below.

While the foregoing first embodiment can accommodate grids that are rotated and grids that are distorted such that the grid elements are still generally in straight lines, it has difficulties with grids that are distorted into curved lines. A second embodiment therefore is provided which can be used instead of or in addition to the first embodiment. The second embodiment is effective for grids that are curved in a single direction, as sometimes results from shrinkage of a polymeric or other substrate along a particular axis.

Figure 7:
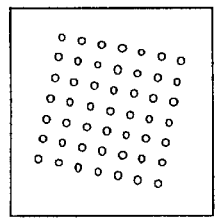
FIG. 7 is an illustration of a second image which might be captured by the scanning system of FIG. 1.
Figure 8:
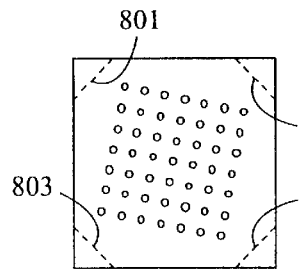
FIG. 8 illustrates a method according to the present invention for identifying the corners of the grid in the image of FIG. 7.
Figure 9:
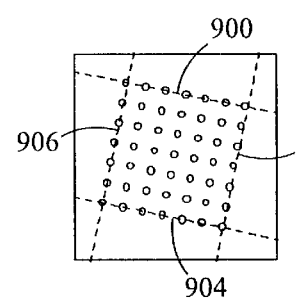
FIG. 9 illustrates a method according to the present invention for identifying the nominal outline of the grid in the image of FIG. 7.

Referring to FIG. 7, an image is captured. The significant features in the image are identified and a collapsed image created in the same fashion as in the first embodiment. In FIG. 8, computer 22 creates search line 801 at one corner of the image, with its normal bisector pointing toward the center of the image. Computer 22 steps search line 801 toward the center of the image. The centroid of the first feature which has an area and/or integrated intensity above a predetermined threshold which is encountered by search line 801 as it moves toward the center of the image is identified as the corner centroid for that search line. This process is repeated with search lines 802, 803, 804 from each of the other corners. Referring to FIG. 9, lines 900, 902, 904, 906 are defined between the corner centroids just identified to define the nominal outline of the grid.

It will be appreciated that while the lines have been shown and described as moving from the corners of the image, this is not necessary; the search lines could move from any edge of the image. In addition, if confidence is high in the dimensions of the grid, two approximately orthogonal search lines would be sufficient to identify the orientation and placement of the grid.

Figure 10:
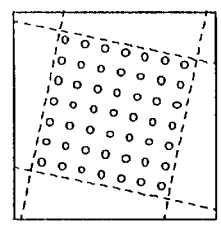
FIG. 10 illustrates a method according to the present invention for determining whether the grid in the image of FIG. 7 is likely to be rectilinear or curved.

In FIG. 10, computer 22 searches outside of the nominal outline of the grid for additional centroids. Centroids within some predetermined margin of the nominal outline will be considered "within" the outline, to allow for some local position variation in the grid, but centroids beyond that margin are considered outside of the nominal outline. If all of the centroids are within the nominal outline of the grid, then it can be assumed that the grid is (a) generally rectilinear. If centroids fall outside of the nominal outline, then it is likely that the grid is (b) curved in at least one direction.

Figure 11:
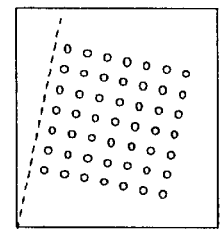
FIG. 11 illustrates a centroid integration process applied to the image of FIG. 7 according to the present invention.
Figure 12:
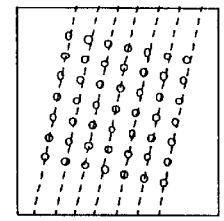
FIG. 12 illustrates a method according to the present invention of defining a set of nominal columns on the grid in the image of FIG. 7.
Figure 13:
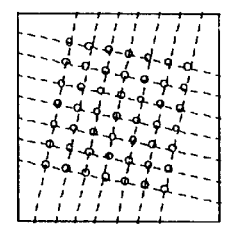
FIG. 13 illustrates a method according to the present invention of defining a set of nominal points on the grid in the image of FIG. 7.

If the grid is considered to be (a) generally rectilinear, the process of the first embodiment can be used to identify the columns and lines. Alternatively, in FIG. 11, computer 22 starts a search line parallel to a side of the nominal outline of the grid, and moves it toward the opposite side, performing centroid integration along the way. A best fit of the centroid integration peaks is made to define the best fit columns shown in FIG. 12. Essentially the same process is repeated in the opposite direction of the grid to find the nominal rows. The nominal positions of the grid elements are defined by finding the intersections of the best fit columns and rows, as shown in FIG. 13, and the grid points flexed, as described in the first embodiment.

Figure 14:
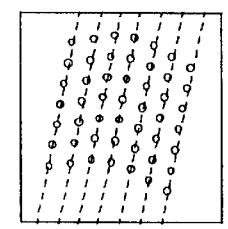
FIG. 14 illustrates a method according to the present invention of defining a set of nominal columns on the grid where the grid is curved.
Figure 15:
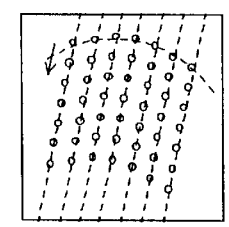
FIG. 15 illustrates a method according to the present invention of defining the shape of the curve in the grid in the image of FIG. 14.

If the grid is curved, as shown in FIG. 14, upon checking for centroids outside of the nominal grid outline, centroids will be found to be outside of the nominal outline, so it will be assumed that the grid is (b) curved. If centroids are found outside just one side of the nominal outline or it is otherwise is known that the grid is likely to be curved only in a single direction, then the simplest method for identifying the nominal grid positions is shown in FIGS. 14–16.

In this method, it is assumed that the curve is convex on the side towards which the centroids were found outside of the nominal outline. The sides adjacent to that side are presumed to be generally straight. A process like that used in either the first embodiment or in FIGS. 11 and 12 can be used to identify the columns in this array parallel to the generally straight sides, as shown in FIG. 14. Once the columns are identified, a search down each column starting from the end thereof either towards or away from the convex side can quickly identify the first centroid in each column, which presumably forms a portion of the first curved row. A best fit is done of the first feature from every column to create a nominal curve, as shown in FIG. 15. The nominal curve is moved down the grid to perform centroid integration, but using a curve instead of a line.

Figure 16:
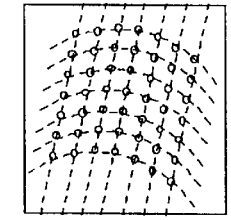
FIG. 16 illustrates a method according to the present invention of defining a set of nominal points on the grid in the image of FIG. 14.

The result, shown in FIG. 16, is a nominal grid of straight columns and curved rows. As in the other embodiments, the intersections of the nominal columns and curved rows define the nominal grid points, and the grid is flexed to identify the final grid points.

Figure 17:
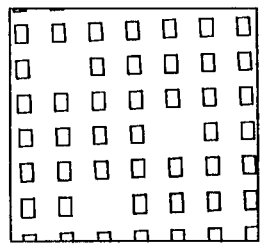
FIG. 17 is an illustration of a third image which might be captured by the scanning system of FIG. 1.
Figure 18:
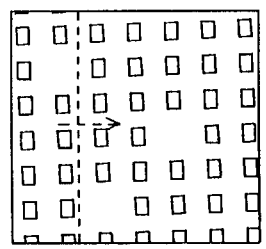
FIG. 18 is an illustration of a centroid integration process applied to the image of FIG. 17 according to the present invention.
Figure 19:
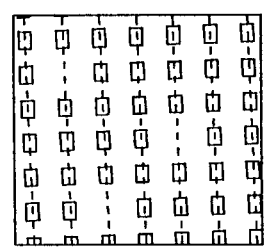
FIG. 19 illustrates a method according to the present invention of defining a set of nominal columns on the grid in the image of FIG. 17.

In many applications, particularly those involving a moving web during manufacturing, only a portion of the grid may be visible in the image. The process of the first embodiment can handle this situation directly, but the complete process of the second embodiment cannot, since no corners can be identified. However, in this situation, it normally can be assumed that the image orientation can be predetermined by virtue of the positioning of the image detector on the web production line, so that the grid orientation in the image is known, such as shown in FIG. 17. In this situation, the expected grid orientation can be used to establish the orientation of the search line. A search line can be started parallel to the expected orientation, as shown in FIG. 18, and moved across the image performing centroid integration. This will result in peaks of integrated intensity that can be used to generate best fit lines, such as shown in FIG. 19. The process can be repeated in the opposite direction, resulting in a set of nominal best fit lines in that direction. If the grid is curved, the process just described for the second embodiment can be used to define the needed curve. Intersections of the resulting rows and columns define a nominal grid, which can be flexed to identify the final grid points.

As will be apparent, the present invention can accept grids in many orientations. Given this flexibility, it is generally advisable to provide some characteristic element or feature on the grid which identifies a specific side or corner of the grid. For example, one feature in the grid array could be used as a marker. Then, no matter what the orientation of the grid in the field of view, the correct orientation of the grid elements relative to predetermined information, such as the nature of the chemicals being testing in each grid element, will be known.

Figure 20:
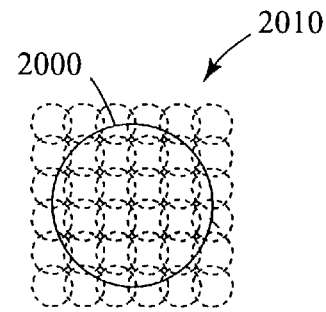
FIG. 20 illustrates the position of pixels around an individual grid feature in any of the images of FIGS. 2, 7, 14 or 17.

Once the position, orientation and dimensions of the grid are known, this information can advantageously be used to reduce the time required to collect the information actually being measured. In a typical image, a given feature will span several pixels. As shown in FIG. 20, feature 2000 spans a 6×6 set of pixels 2010. To scan the pixels in feature 2000, motor 24 moves mirror 14 to direct the scanning beam on each pixel 2010 in turn. Measurements are made of each pixel 2010.

Figure 21:
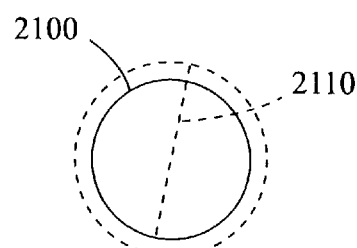
FIG. 21 illustrates a process of re-adjusting the system of FIG. 1 to encompass an entire feature in any of the images of FIGS. 2, 7, 14 or 17.

Alternatively, as shown in FIG. 21, the scanning beam can be re-adjusted to have a diameter 2110 slightly larger than the feature 2100. Using this technique, the entire feature can be measured at one time. This is particularly advantageous when measuring the total luminescence or similar characteristic of a feature. The scanning beam can be re-adjusted on each feature in the grid. The total number of measurements needed thus is minimized, and exactly matches the total number of significant features.

The first steps of the third embodiment are conducted in substantially the same manner as the first steps of the second embodiment. Search lines are established and moved toward the center of the image until they intersect a centroid. The four centroids found this way are assumed to be the corners of the grid, and a nominal outline of the grid is established between them. However, the second embodiment assumes that the gird is probably generally straight, or at most curved in a single direction, but the third embodiment makes no such assumptions.

Figure 23A:
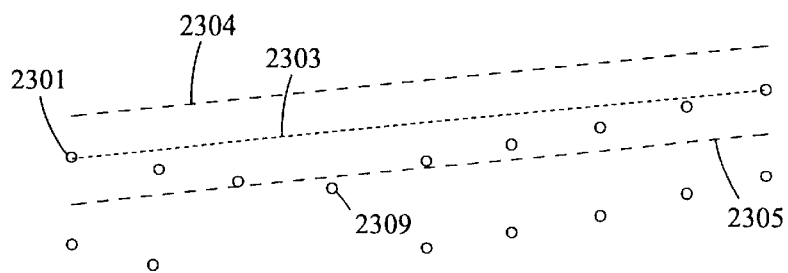
FIGS. 23a, 23b illustrate a method according to the present invention for determining the distances between centroids forming a possibly distorted grid.
Figure 23B:
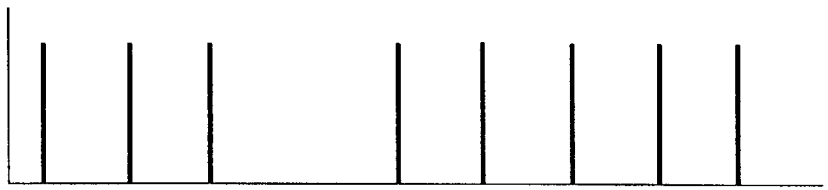
Figure 24:
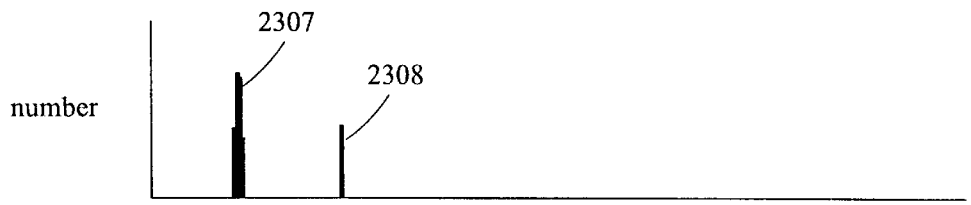
FIG. 24 is a histogram of the distances determined in FIG. 23b.

Having determined the corners and nominal outline of the grid, the third embodiment proceeds to determine the nominal spacing between the centroids forming the side of the grid. Referring to FIG. 23a, starting at the centroid 2301 at one end of the side 2303 of the nominal outline, a search is conducted for centroids within a window defined by margins 2304, 2305 on either side of the side 2303. The distance between each centroid and the next centroid within the window along the side is determined, as shown in FIG. 23b. The value of the first peak 2307 in a histogram of these distances, shown in FIG. 24, then is assumed to be the nominal spacing between centroids along the side 2303.

Ideally, the size of the margins 2304, 2305 is one half of the nominal distance, but since that is not known at the outset, some approximation must be used. A simple initial approximation is to divide the length of the nominal side 2303 by the square root of the number of centroids in the image.

Note that the presence of any peaks 2308 in the histogram beyond the first peak 2307 may indicate that the side 2303 is so curved that a point (such as 2309 in FIG. 23a) is outside of the search window, or that the initial approximation for the size of the search window was too small, e.g., because the grid is not a square, and the initial approximation therefore was highly inaccurate. In some circumstances, e.g., if there are quite a number of peaks in the histogram, it may be desirable to iterate this process using a new search window defined using one half of the nominal distance found on the first iteration to define the margins 2304, 2305.

Figure 25:
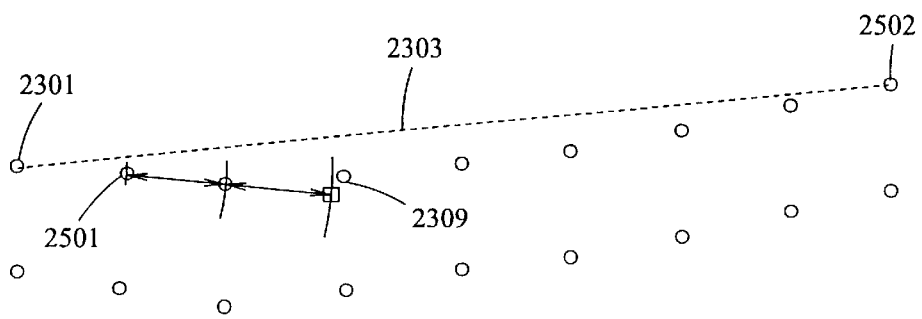
FIG. 25 illustrates a method of according to the present invention for identifying the. actual centroids forming a row or column in a grid.

Once the nominal spacing is defined, the third embodiment then finds each point in the side 2303. As shown in FIG. 25, a search is conducted starting from centroid 2301 at one end of the nominal side 2303. The search looks for the centroid closest to the nominal distance away from the centroid 2301, and generally in the direction toward the opposite end of the nominal side 2303. This closest centroid 2501 then is assumed to be the next centroid on the side 2303. The process then is repeated using the distance from centroid 2301 to centroid 2501 instead of the nominal distance, and searching generally in the direction of the line between centroid 2301 and centroid 2501, instead of in the direction of the nominal side. The process then iterates until reaching the centroid 2502 at the opposite end of nominal side 2303.

Having found the centroids actually making up the side of the grid, a best fit, e.g., a third order polynomial, is made of those centroids to define a curve. This curve then is moved across the image to the opposite side of the grid to perform centroid integration, just as the line was moved in the second embodiment. The position of the first centroid integration peak after the side is assumed to be approximate position of the next row or column in the grid.

While it is possible to define the subsequent grid rows or columns by finding the points closest to this initial curve, if the grid distortion varies a great deal, this will be a poor fit. Therefore, it is may be necessary to repeat the process used to find the centroids forming the side at each row or column in the grid, but using the curve established by the prior grid as the base line instead of the line used for the nominal side. A new curve then is established for each row or column. However, in many situations it will be sufficient to establish the new curve by making a best fit of the centroids forming the centroid integration peak for the row or column being analyzed, which is much simpler. In either case, the new curve is used to search for the next row or column.

This process then is repeated starting from a nominal side roughly orthogonal to the nominal side first used. The intersections of all of the defined curves then are used to define the nominal grid, and the grid is flexed, just as in the prior embodiments. Preferably, when the grid is flexed the local search for a centroid near to each nominal grid point is conducted over an area based on the spacing of the grid around that nominal grid point, as determined in the course of defining the rows and columns above, e.g., over a radius one-half of the distance between the point and its nearest neighbors. Since grid distortion may vary considerably on a local scale, this will adapt the search to the local scale and any distortions in it.

Figure 26:
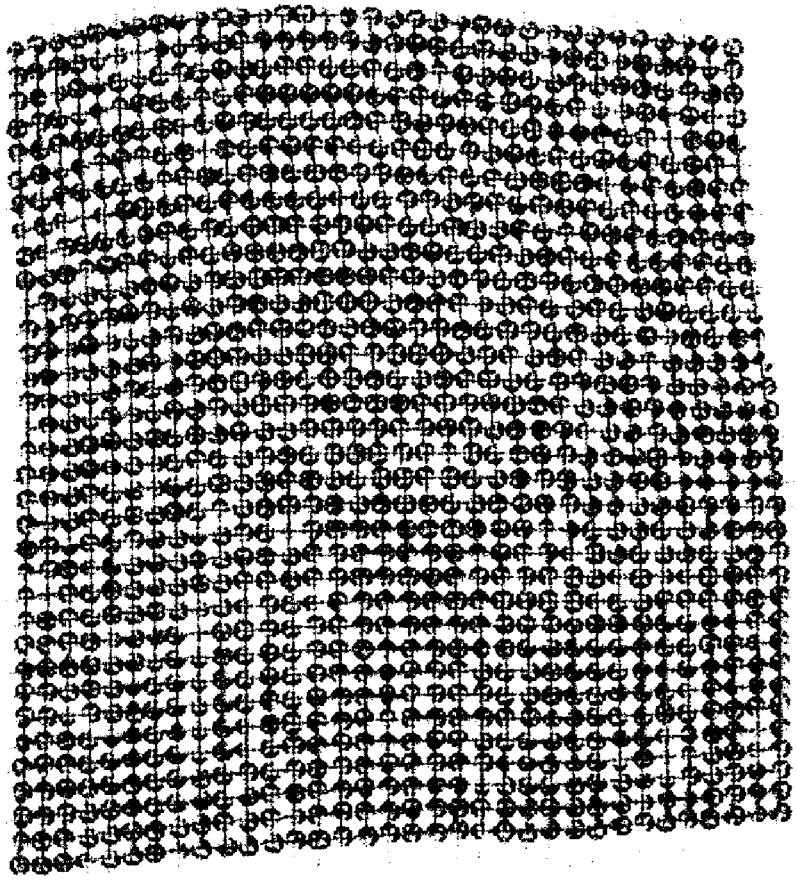
FIG. 26 illustrates a highly distorted grid mapped according to the present invention.

The result of this is an accurate grid mapping even for highly distorted grids, such as that shown in FIG. 26.

Figure 27:
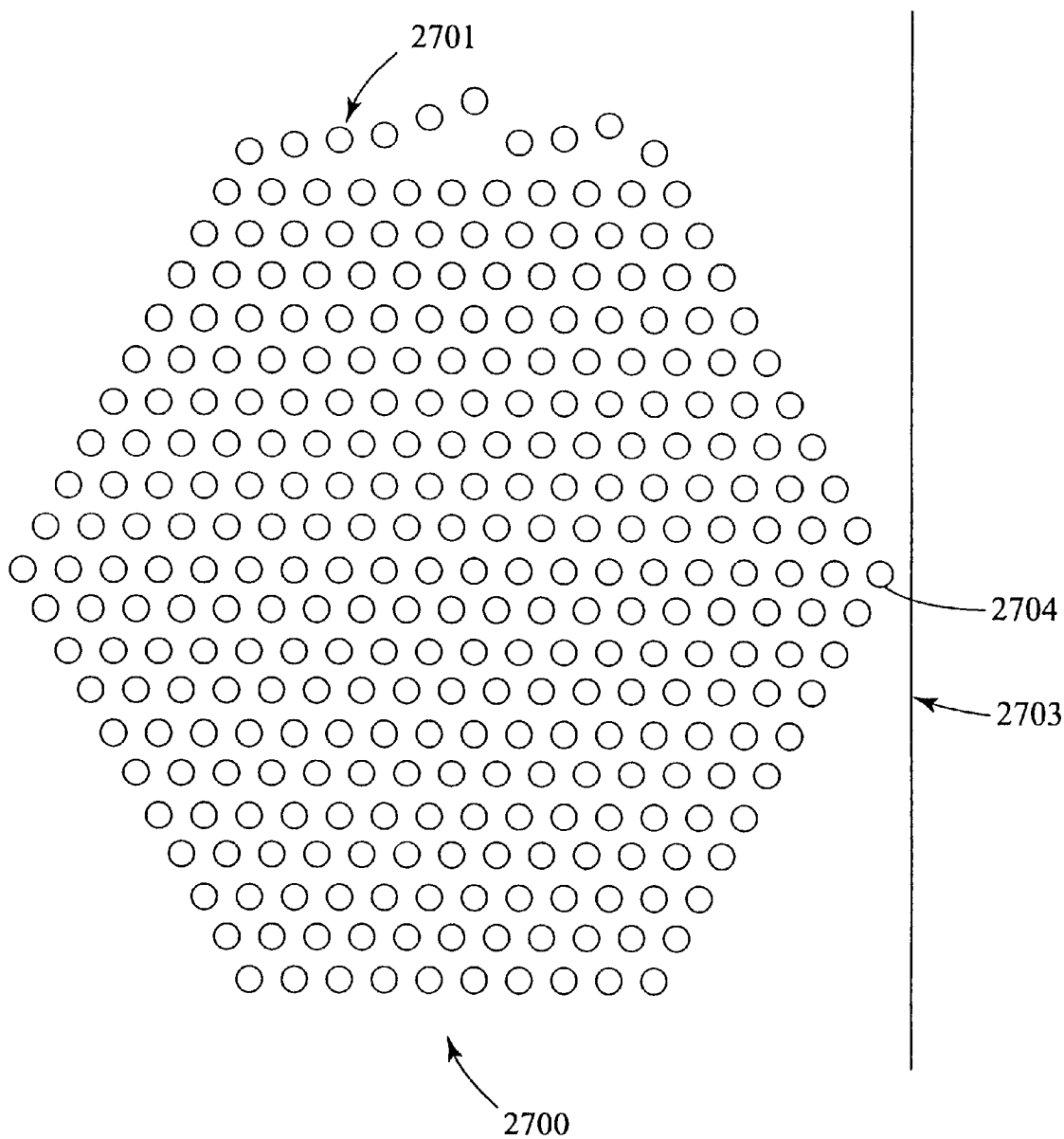
FIGS. 27–30 illustrate an embodiment of a method according the present invention which is particularly useful with grids having other than four sides.

A fourth embodiment of the invention provides a further refinement which is particularly useful with a grid having more or less than four sides. For purposes of description, a grid 2700 which nominally has six sides is shown in FIG. 27, one side 2701 of which is somewhat distorted. A search line 2703 is swept in from one side of the image until it intersects a centroid 2704. This first centroid 2704 is assumed to be a corner of the grid 2700.

Figure 28:
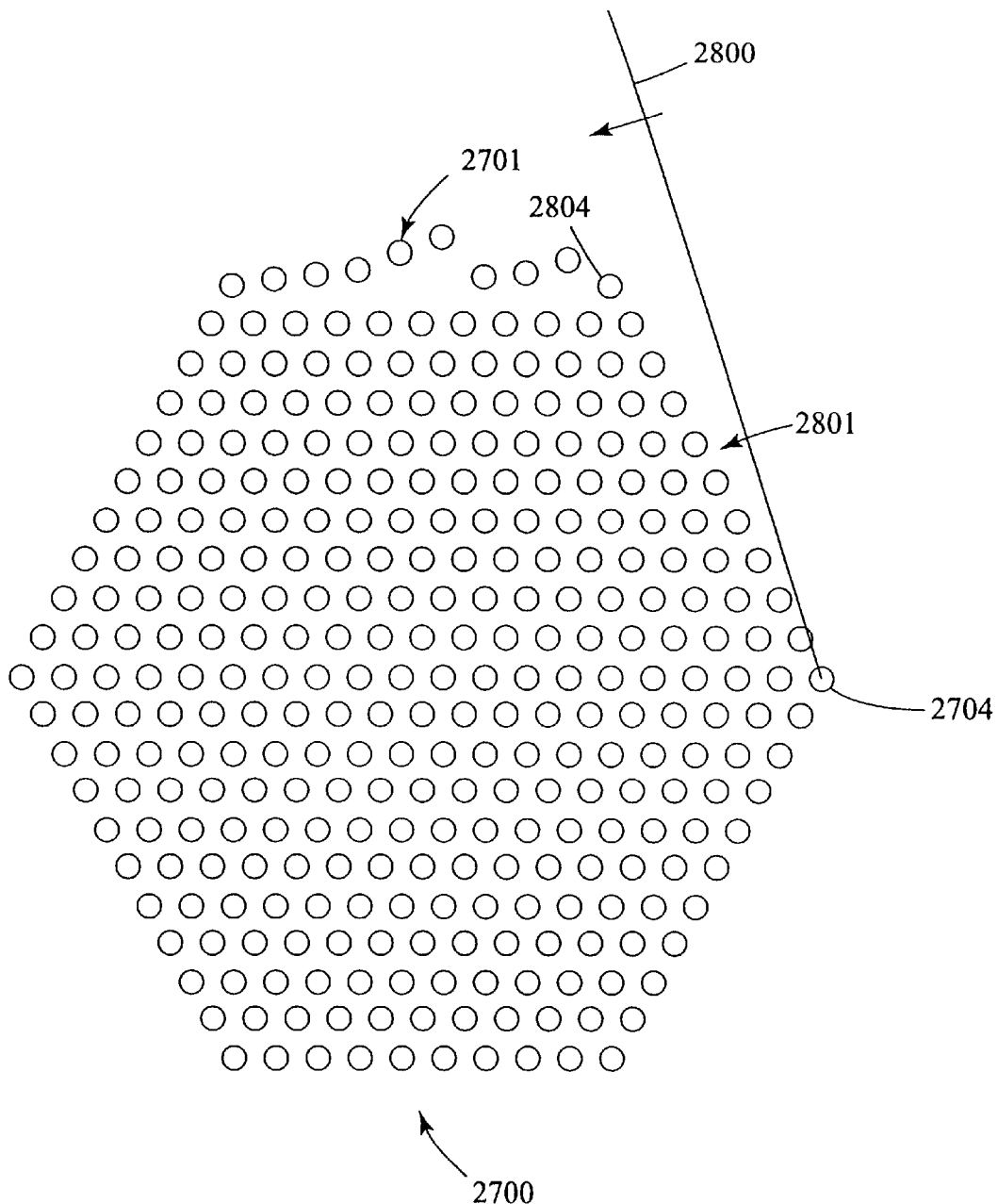

Referring to FIG. 28, a search line 2800 then is pivoted about the first centroid 2704 to perform centroid integration. The first peak in the centroid integration will occur at the angle corresponding to the side 2801. A search then is conducted along the direction of this angle from the centroid 2704 to locate the centroid 2804 at the other end of the same side (much as was done along each side in the third embodiment above), which is assumed to be the next corner.

Figure 29:
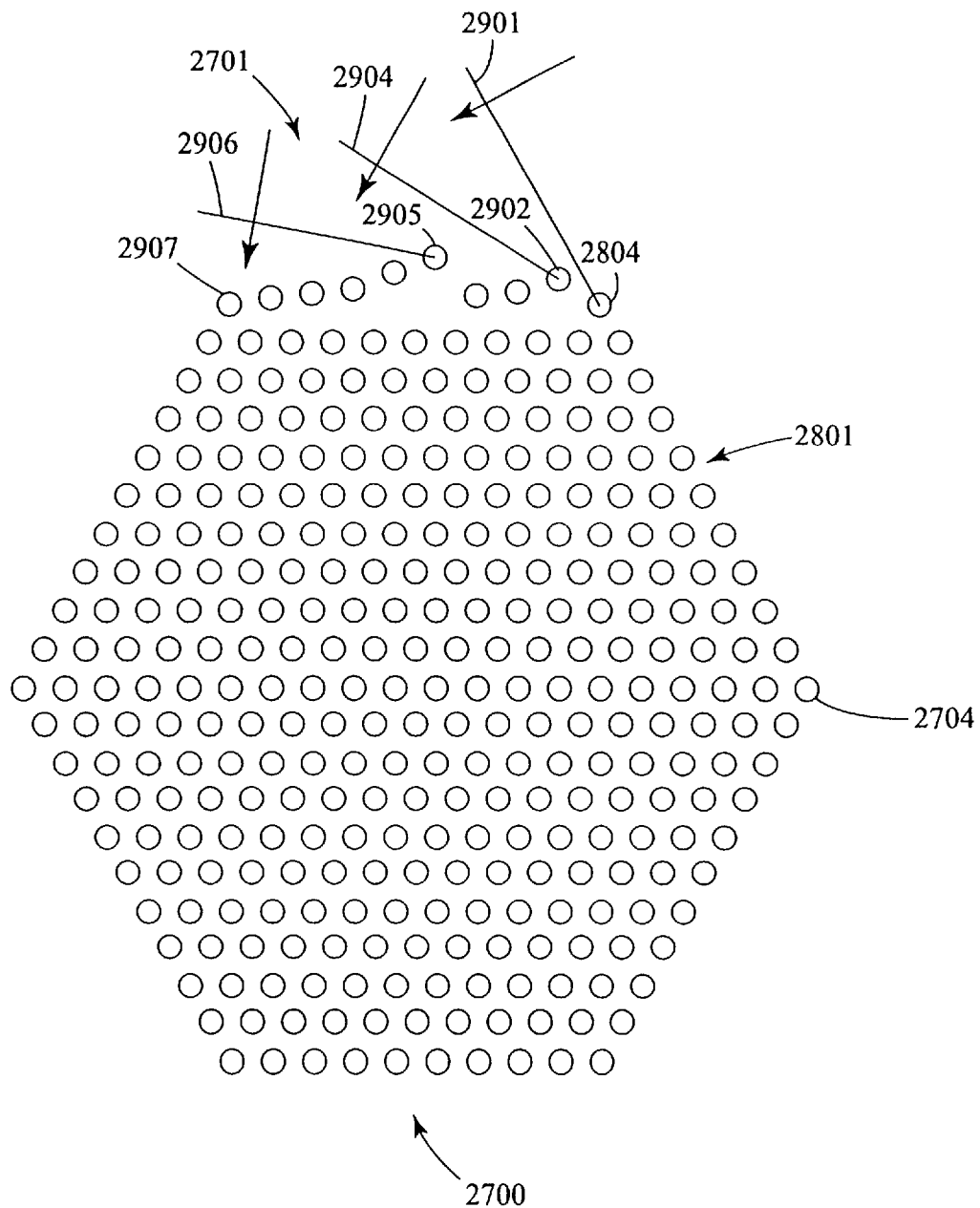

Referring to FIG. 29, a search line 2901 then is pivoted about the second centroid 2804 to perform centroid integration. Preferably, the line 2901 starts positioned in line with side 2801, then sweeps toward the center of the image.

As noted before, the side 2701 is distorted. This means that centroid integration along the search line 2901 will identify a false side ending in a false corner centroid 2902 that is not actually a full side and corner of the grid. Nevertheless, for the moment centroid 2902 is treated as the next corner, a new search line 2904 is pivoted around it, to find yet another false side and false corner centroid 2905. The process is repeated with search line 2906 to find centroid 2907, and then repeated all the way around the grid until centroid 2704 is again reached.

Figure 30:
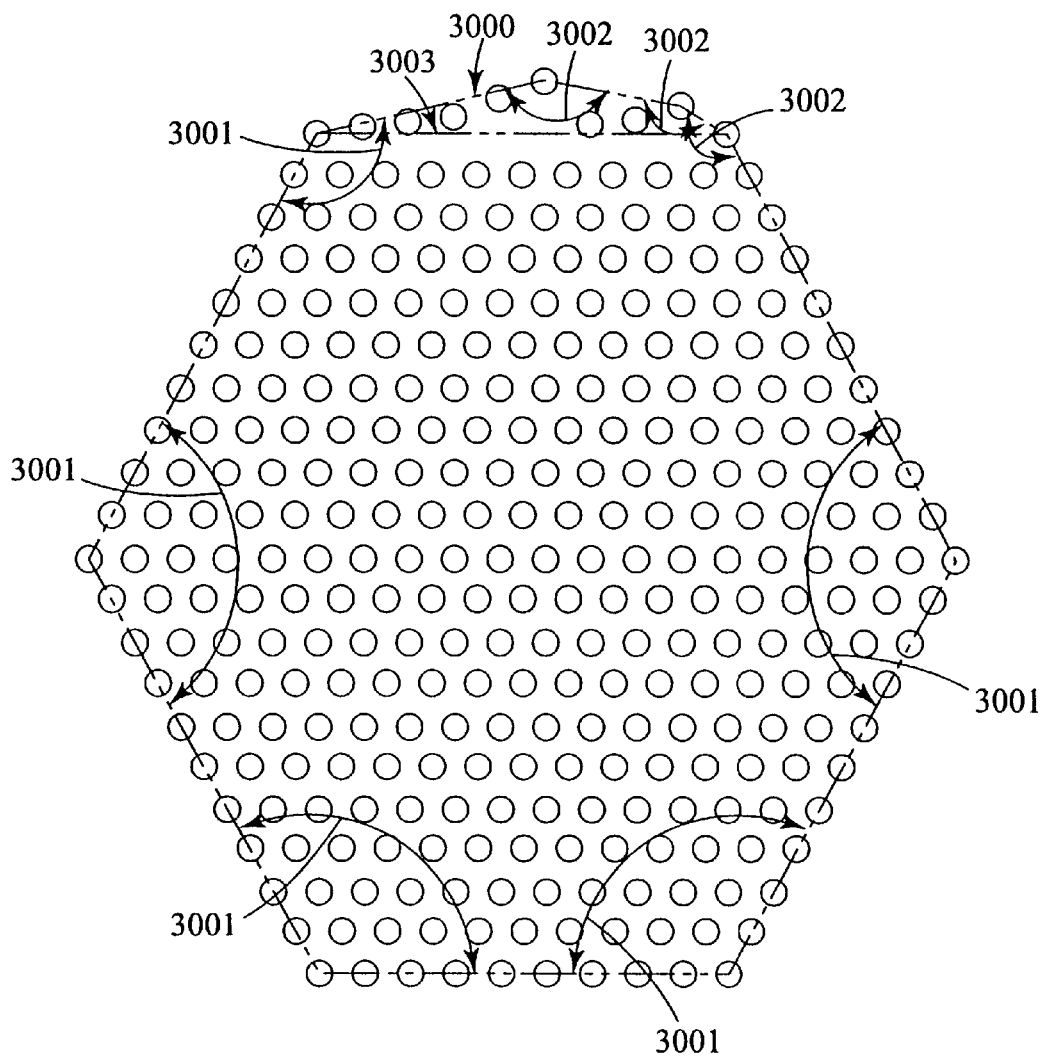

The corners (both real and false) thus identified are then used to define a nominal outline 3000, as shown in FIG. 30. As will be apparent from the figure, the angles 3001, at the real corners will be smaller than the angles 3002 at the false corners. This can be used to distinguish between the two types of corners to identify the real corners. If the nominally correct angle is known, e.g., 60° for the hexagon shown, then any angle greater than 60° (or perhaps, 65° to allow for some distortion) can be assumed to be a false corner. Alternatively, a histogram of all of the angles can be prepared. The peak representing the smallest angle (and having a value greater than 1, to avoid problems from a highly distorted corner) then identifies the nominally correct angle. Any angles not forming part of that peak then represent false corners. The width of the peak can be defined arbitrarily, e.g., a few degrees, or calculated based on the data, e.g., determine the standard deviation of the angles making up the peak, and consider any corner having an associated angle more than two standard deviations away from that to be a false corner. In either case, the false corners then are omitted, and a new nominal outline 3003 defined. Note that with this process, it does not matter if the first centroid 2704 encountered by the initial search line 2703 is a real or a false corner—the process proceeds in the same manner either way.

Once the nominal outline is defined, the locations of the centroids in the grid 2700 then can be defined using any of the techniques described in the other embodiments.

As will be apparent, different approaches described above can be combined in different ways. For example, when conducting centroid integration to identify a row or curve in the grid, the third embodiment calls for use of the curve generated for the prior row or column, but that curve, or variants of it, can be swept across the image to find the best fit, as discussed in connection with FIG. 3 above. Or, if the position of the nominal outline is known from some other source, e.g., if a user identifies the corners of the grid in the image, it would not be necessary to find the corners of the grid at the beginning of the second and third embodiments.

The order in which many of the steps of the different embodiments of the invention are executed also may be varied from that described and claimed here, while still achieving the same result and without departing from the scope of the present invention.

It therefore will be understood that these exemplary embodiments in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and scope of the appended claims are covered.

I claim:

1. A method of identifying the position in an image of a plurality of features in a substantially four-sided, four-cornered grid of features, each feature having a centroid, comprising:
   a) obtaining an image;
   b) identifying the significant features in the image;
   c) defining centroids for each significant feature;
   d) identifying the centroids at the four corners of the grid and defining a nominal four-sided outline between them;
   e) searching for centroids within a window defined by a predetermined margin of one side of the nominal outline;
   f) determining the distance from each such centroid found in the window to the next such centroids along the one side;
   g) preparing a histogram of such distance for all centroids in the window; and
   h) defining a nominal distance between centroids for the one side as the distance represented by the first peak in the histogram.

2. The method of claim 1, further comprising:
   a) defining the centroid at one end of the one side as a first centroid;
   b) starting from the first centroid, searching for the centroid which is nearest to a position the nominal distance away from the first centroid and along the one side;
   c) defining the centroid found in that search as the subsequent centroid in the one side.

3. The method of claim 2, further comprising:
   a) defining the subsequent centroid from the prior step as the new first centroid;
   b) starting from new first centroid, searching for the centroid which is nearest to a position the same distance away from the new first centroid as the new first centroid is from the first centroid of the prior step and along a line projected from the first centroid of the prior step to the new first centroid;
   c) defining the nearest centroid found in that search as the subsequent centroid in the one side; and
   d) iterating steps (a) through (c) until the subsequent centroid found is the centroid at the other end of the one side.

4. The method of claim 3, further comprising:
   a) calculating a best fit curve for the centroids found in claim 3;

b) defining that curve as the nominal curve of the one side;
c) moving the curve toward the opposite side of the nominal outline to perform centroid integration; and
d) identifying the first peak in the centroid integration after the one side as the expected position of the next column in the grid.

5. The method of claim 4, further comprising:
a) identifying the centroids forming the first peak in the centroid integration performed for the prior column;
b) calculating a best fit curve for such centroids;
c) defining that curve as the nominal curve of that column.

6. The method of claim 5, further comprising:
a) moving the nominal curve for the column toward the opposite side of the nominal outline to perform centroid integration; and
b) identifying the first peak in the centroid integration after the one side as the expected position of the next column in the grid.

7. The method of claim 6, further comprising iterating the steps of claim 5 to identify a nominal curve for each column in the grid, at each iteration using the curve developed from the prior iteration in place of the curve used in the prior iteration.

8. The method of claim 7 further comprising iterating steps 36.*e*) through 36.*h*) and the steps of claims 2 through 7 to identify a nominal curve for each row in the grid by starting from a side of the nominal outline adjacent to the one side.

9. The method of claim 8, further comprising defining the nominal positions of the features in the grid as the intersections of the sets of best fit rows and columns.

10. The method of claim 9, further comprising identifying the actual positions of the features in the grid by defining the position of the centroid closest to each identified nominal position of a feature in the grid as the actual position for that feature in the grid.

11. The method of claim 10, wherein the centroid closest to each identified nominal position of a feature in the grid must also be within one-half of the average distance from that nominal position to the adjacent nominal positions to be defined as the actual position for that feature in the grid.

12. The method of claim 4, further comprising iterating steps 36.*e*) through 36.*h*) and the steps of claims 2 through 4 to identify a nominal curve for each column in the grid, at each iteration using the curve developed from the prior iteration in place of the curve used in the prior iteration.

13. The method of claim 12, further comprising iterating steps 36.*e*) through 36.*h*) and the steps of claims 2 through 4 and claim 12 to identify a nominal curve for each row in the grid by starting from a side of the nominal outline adjacent to the one side.

14. The method of claim 13, further comprising defining the nominal positions of the features in the grid as the intersections of the sets of best fit rows and columns.

15. The method of claim 14, further comprising identifying the actual positions of the features in the grid by defining the position of the centroid closest to each identified nominal position of a feature in the grid as the actual position for that feature in the grid.

16. The method of claim 16, wherein the centroid closest to each identified nominal position of a feature in the grid must also be within one-half of the average distance from that nominal position to the adjacent nominal positions to be defined as the actual position for that feature in the grid.

17. A method of identifying the position and nominal outline in an image of a multi-sided, multi-cornered grid of features, comprising:

a) obtaining an image;
b) identifying the significant features in the image;
c) defining a centroid for each significant feature;
d) placing a search line on the perimeter of the image and moving it across the image until it contacts a first centroid;
e) defining the position of the first centroid as a corner of the grid;
f) placing a search line at the first corner of the grid, and rotating it toward the center of the image to perform centroid integration;
g) defining the centroids corresponding to the first peak in the centroid integration as the first side of the grid;
h) identifying as the next corner that centroid which is along the first side of the grid and farthest from the first corner;
i) placing a search line at the next corner of the grid, and rotating it toward the center of the image to perform centroid integration;
j) defining the centroids corresponding to the first peak in the centroid integration conducted in step i) as the next side of the grid; and
k) identifying as the subsequent corner that centroid which is along the next side of the grid and farthest from the next corner.

18. The method of claim 17, further comprising repeating steps 52.*i*) through 52.*k*) in claim 17 using each subsequent corner as the next corner until the subsequent corner is the first corner.

19. The method of claim 18, further comprising
a) defining lines connecting adjacent corners of the grid;
b) determining the angles between adjacent lines;
c) identifying any angles outside a threshold angle range as corresponding to false corners and within that threshold range as real corners;
d) defining lines connecting adjacent real corners of the grid as the nominal outline of the grid.

20. The method of claim 19, wherein the nominally correct corner angle for the grid is known, and the threshold range is set at the nominally correct angle plus or minus a small amount.

21. The method of claim 19, wherein the threshold angle range is determined by:
a) preparing a histogram of all angles, and identifying the peak representing the largest angle and having more than one count;
b) determining the standard deviation of the angles forming the peak thus identified; and
c) setting the threshold range as the average angle of the angles forming the peak thus identified, plus or minus two standard deviations.

22. A system for identifying the position in an image of a plurality of features in a substantially four-sided, four-cornered grid of features, each feature having a centroid, the system comprising:
a) an image capture device for capturing an image;
b) a data storage device; and
c) a central processing unit for receiving a captured image from the image capture device and which can write to and read from the data storage unit, the central processing unit being programmed to:
i) obtain an image;
ii) identify the significant features in the image;

iii) define centroids for each significant feature;
iv) identify the centroids at the four corners of the grid and define a nominal four sided outline between them;
v) search for centroids within a window defined by a predetermined margin of one side of the nominal outline;
vi) determine the distance between each such centroid found in window to the next such centroid along the one side;
vii) prepare a histogram of such distance for all centroids in the window; and
viii) define a nominal distance between centroids for the one side as the distance represented by the first peak in the histogram.

23. The system of claim 22, wherein the central processing unit further is programmed to:
a) define the centroid at one end of the one side as a first centroid;
b) starting from the first centroid, search for the centroid which is nearest to a position the nominal distance away from the first centroid and along the one side;
c) define the centroid found in that search as the subsequent centroid in the one side.

24. The system of claim 23, wherein the central processing unit further is programmed to:
a) define the subsequent centroid from the prior step as the new first centroid;
b) starting from new first centroid, search for the centroid which is nearest to a position the same distance away from the new first centroid as the new first centroid is from the first centroid of the prior step and along a line projected from the first centroid of the prior step to the new first centroid;
c) define the nearest centroid found in that search as the subsequent centroid in the one side; and
d) iterating steps (a) through (c) until the subsequent centroid found is the centroid at the other end of the one side.

25. The system of claim 24, wherein the central processing unit further is programmed to:
a) calculate a best fit curve for the centroids found in claim 24;
b) define that curve as the nominal curve of the one side; and
c) move the curve toward the opposite side of the nominal outline to perform centroid integration;
d) identify the first peak in the centroid integration after the one side as the expected position of the next column in the grid.

26. The system of claim 25, wherein the central processing unit further is programmed to:
a) identify the centroids forming the first peak in the centroid integration performed for the prior column;
b) calculate a best fit curve for such centroids;
c) define that curve as the nominal curve of that column.

27. The system of claim 26, wherein the central processing unit further is programmed to:
a) move the nominal curve for the column toward the opposite side of the nominal outline to perform centroid integration; and
b) identify the first peak in the centroid integration after the one side as the expected position of the next column in the grid.

28. The system of claim 27, wherein the central processing unit further is programmed to iterate the steps of claims 26 and 27 to identify a nominal curve for each column in the grid, at each iteration using the curve developed from the prior iteration in place of the curve used in the prior iteration.

29. The system of claim 28, wherein the central processing unit further is programmed to iterate the steps 92.c)v) through 92.c)viii) and the steps of claims 23 through 28 to identify a nominal curve for each row in the grid by starting from a side of the nominal outline adjacent to the one side.

30. The system of claim 29 wherein the central processing unit further is programmed to define the nominal positions of the features in the grid as the intersections of the sets of best fit rows and columns.

31. The system of claim 30, wherein the central processing unit further is programmed to identify the actual positions of the features in the grid by defining the position of the centroid closest to each identified nominal position of a feature in the grid as the actual position for that feature in the grid.

32. The system of claim 31, wherein the centroid closest to each identified nominal position of a feature in the grid must also be within one-half of the average distance from that nominal position to the adjacent nominal positions to be defined as the actual position for that feature in the grid.

33. The system of claim 35, wherein the central processing unit further is programmed to iterate steps 92.c)v) through 92.c)viii) and the steps of claims 23 through 25 to identify a nominal curve for each column in the grid, at each iteration using the curve developed from the prior iteration in place of the curve used in the prior iteration.

34. The system of claim 33 wherein the central processing unit further is programed to iterate steps 92.c)v) through 92.c)viii) and the steps of claims 23 through 35 and claim 33 to identify a nominal curve for each row in the grid by starting from a side of the nominal outline adjacent to the one side.

35. The system of claim 34, wherein the central processing unit further is programed to define the nominal positions of the features in the grid as the intersections of the sets of best fit rows and columns.

36. The system of claim 35, wherein the central processing unit further is programmed to identify the actual positions of the features in the grid by defining the position of the centroid closest to each identified nominal position of a feature in the grid as the actual position for that feature in the grid.

37. The system of claim 36, wherein the centroid closest to each identified nominal position of a feature in the grid must also be within one-half of the average distance from that nominal position to the adjacent nominal positions to be defined as the actual position for that feature in the grid.

38. A system for identifying the position in an image of a plurality of features in a multi-sided, multi-covered cornered grid of features, each feature having a centroid, the system comprising:
a) an image capture device for capturing an image;
b) a data storage device; and
c) a central processing unit for receiving a captured image from the image capture device and which can write to and read from the data storage unit, the central processing unit being programmed to:
i) obtain an image;
ii) identify the significant features in the image;
iii) define a centroid for each significant feature;
iv) place a search line on the perimeter of the image and move it across the image until it contacts a first centroid;

v) define the position of the first centroid as a corner of the grid;

vi) place a search line at the first corner of the grid, and rotate it toward the center of the image to perform centroid integration;

vii) define the centroids corresponding to the first peak in the centroid integration as the first side of the grid;

viii) identify as the next corner that centroid which is along the first side of the grid and farthest from the first corner;

ix) place a search line at the next corner of the grid, and rotate it toward the center of the image to perform centroid integration;

x) define the centroids corresponding to the first peak in the centroid integration conducted in step 52.i) as the next side of the grid; and xi) identify as the subsequent corner that centroid which is along the next side of the grid and farthest from the next corner.

39. The system of claim 38, wherein the central processing unit further is programmed to repeat steps 108.*c*)ix) through 108.*c*)xi) using each subsequent corner as the next corner until the subsequent corner is the first corner.

40. The system of claim 39, wherein the central processing unit further is programmed to:

a) define lines connecting adjacent corners of the grid;

b) determine the angles between adjacent lines;

c) identify any angles outside a threshold angle range as corresponding to false corners and within that threshold range as real corners;

d) define lines connecting adjacent real corners of the grid as the nominal outline of the grid.

41. The system of claim 40, wherein the nominally correct corner angle for the grid is known, and the central processing unit further is programmed to set the threshold range at the nominally correct angle plus or minus a small amount.

42. The system of claim 40, wherein central processing unit further is programmed to:

a) prepare a histogram of all angles, and identify the peak representing the largest angle and having more than one count;

b) determine the standard deviation of the angles forming the peak thus identified; and c) set the threshold range as the average angle of the angles forming the peak thus identified, plus or minus two standard deviations.

* * * * *

UNITED STATES PATENT AND TRADEMARK OFFICE
CERTIFICATE OF CORRECTION

PATENT NO. : 6,714,675 B1
APPLICATION NO. : 09/540472
DATED : March 30, 2004
INVENTOR(S) : Atkinson It is certified that error appears in the above-identified patent and that said Letters Patent is hereby corrected as shown below:

Column 5
Line 26; "color" should read -- columns --
Line 36 – 67; Delete all lines, this is the second occurrence.

Column 6
Line 1 – 16; Delete all lines, this is the second occurrence.
Line 17; "even require knowing"
                      should read -- require knowing --

Column 7
Line 61; "the. actual" should read -- the actual --

Column 15
Line 31; "3001, at" should read -- 3001 at --

Column 17
Claim 7, Line 20; "claim 5" should read -- claims 5 and 6 --
Claim 8, Line 24; "7 further" should read -- 7, further --
Claim 8, Line 25; "steps 36.e) through 36.h)"
                should read -- steps 1.e) through 1.h) --
Claim 12, Line 43; "steps 36.e) through 36.h)"
                should read -- steps 1.e) through 1.h) --
Claim 13, Line 48; "steps 36.e) through 36.h)"
                should read -- steps 1.e) through 1.h) --

Column 18
Claim 18, Line 29; "steps 52.i) through 52.k)"
                should read -- steps 17.i) through 17.k) --

UNITED STATES PATENT AND TRADEMARK OFFICE
CERTIFICATE OF CORRECTION

PATENT NO. : 6,714,675 B1
APPLICATION NO. : 09/540472
DATED : March 30, 2004
INVENTOR(S) : Atkinson It is certified that error appears in the above-identified patent and that said Letters Patent is hereby corrected as shown below:

Column 20
Claim 29, Line 7 – 8; "steps 92.c)v) through 92.c)viii)"
    should read -- steps 22.c)v) through 22.c)viii) --
Claim 30, Line 11; "claim 29" should read -- claim 29, --
Claim 33, Line 25; "claim 35" should read -- claim 25 --
Claim 33, Line 26 – 27; "steps 92.c)v) through 92.c)viii)"
    should read -- steps 22.c)v) through 22.c)viii) --
Claim 34, Line 31; "claim 33" should read -- claim 33, --
Claim 34, Line 32; "programed"
    should read -- programmed --
Claim 34, Line 32 – 33; "steps 92.c)v) through 92.c)viii)"
    should read -- steps 22.c)v) through 22.c)viii) --
Claim 34, Line 33; "through 35" should read --through 25 --
Claim 35, Line 38; "programed"
    should read -- programmed --
Claim 38, Line 53; "multi-covered cornered"
    should read -- multi-cornered --

Column 21
Claim 38, Line 15; "step 52.i)" should read -- step 17.i) --
Claim 39, Line 21 – 22; "steps 108.c)ix) through 108.c)xi)"
    should read -- steps 38.c)ix) through 38.c)xi) --

Signed and Sealed this

Fifth Day of December, 20006

JON W. DUDAS
*Director of the United States Patent and Trademark Office*